United States Patent [19]
Danzer

[11] 3,787,847
[45] Jan. 22, 1974

[54] INTENSITY CURSOR FOR RADAR
[76] Inventor: Paul M. Danzer, 2 Dawn Rd., Norwalk, Conn. 06851
[22] Filed: Feb. 9, 1973
[21] Appl. No.: 330,918

[52] U.S. Cl............... 343/7.3, 343/5 EM, 343/7 A
[51] Int. Cl............................................... G01s 7/22
[58] Field of Search................... 343/5 EM, 7 A, 7.3

[56] References Cited
UNITED STATES PATENTS
| | | | |
|---|---|---|---|
| 2,991,445 | 7/1961 | Haynes et al. | 343/5 EM |
| 3,076,120 | 1/1963 | Matthews et al. | 343/5 EM X |
| 3,151,322 | 9/1964 | Hildebrandt | 343/7 A X |
| 3,120,661 | 2/1964 | White et al. | 343/5 EM X |
| 3,182,320 | 5/1965 | Frank | 343/7.3 |

Primary Examiner—Malcolm F. Hubler
Attorney, Agent, or Firm—Melvin Pearson Williams

[57] ABSTRACT

A radar, such as a track-while-scan radar, which is provided with early and late tracking gates interconnected with cursors, blanks out the electronic cursors presentation within the gate region of the display and, instead, modulates the intensity of targets within the tracking gates so that the more closely the cursors are positioned on the center of the target, the higher the intensity of the video in the vicinity of the cursors.

4 Claims, 4 Drawing Figures

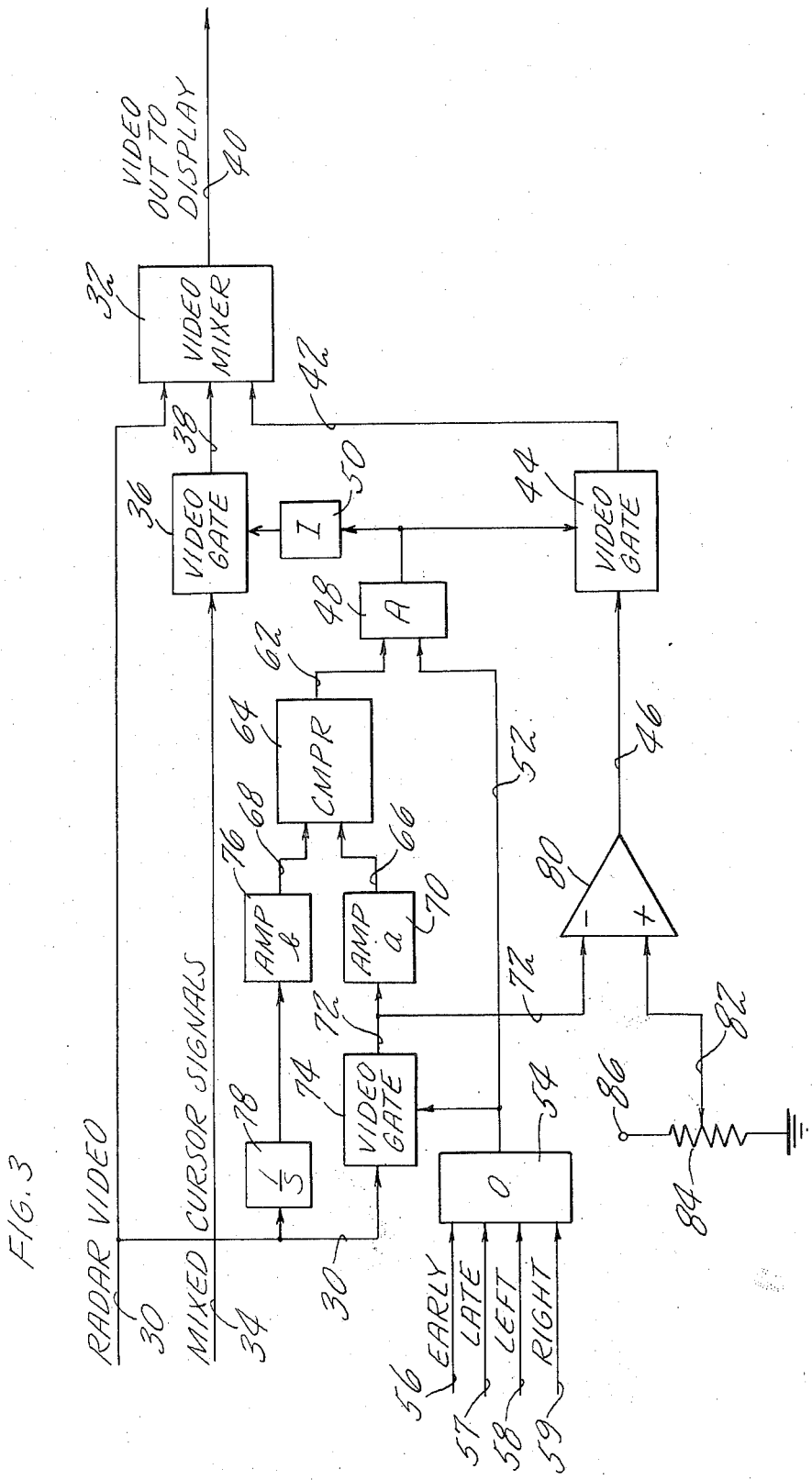

INTENSITY CURSOR FOR RADAR

BACKGROUND OF THE INVENTION

1. Field of Invention

This invention relates to radar cursors, and more particularly to an electronic intensity cursor for accurate cursor positioning of targets within tracking gates.

2. Description of the Prior Art

A now well known innovation in search radars is the track-while-scan feature which allows pinpointing the instantaneous location of a target within a rather broad beamwidth, and to a range resolution which is within the ultimate range resolution of the radar, and then by means of computer processing, tracks the target while the scanning of an entire area continues. The tracking is updated once in each scan.

The radar antenna scans back and forth in azimuth, thereby sweeping a segment of the atmosphere in front of the radar, or the ground ahead of and below the radar, at a frequency of several Hz, while presenting strong signal returns on a plan position indicator (PPI) cathode ray tube radar scope. The radar transmits pulses of RF energy at a pulse repetition frequency which may be on the order of one or several KHz. As each pulse propagates outwardly, the energy is reflected off various target surfaces, and for surfaces which are suitably oriented with respect to the radar, return signals are received in the order in which the targets are contacted. Thus targets at a closer range appear sooner and targets at a further range appear later; by causing the sweep of the PPI scope to start at a zero range base for each pulse, the return signals will coincide with the position on the PPI scope which indicates its relative range. Since the antenna is scanning in azimuth, each pulse goes out in a different radial direction (a different azimuthal angle).

Because the beams of search radars are very broad, and because the pulsewidths are made large so as to transmit a large amount of energy for a maximum return signal (thereby to detect even weak targets such as small aircraft or motor vehicles) the target return signals indicate targets as being much larger than they are since return signals commence at a minimum range and extend through the length of the entire pulse thereby falsely indicating a still greater range, and return signals are received from the moment that the beam pattern first contacts the target, throughout several pulses while the beam pattern scans across the target, to the last pulse when any portion of the beam intersects the target. The track-while-scan radar narrows down the location of the target to one or two pulses in azimuth and to within one range gate resolution in range by determining a particular angle in azimuth and a particular range before and after which (in each case) one half of the energy (usually taken as a summation of voltages) is received by the antenna. The tracking gate is substantially one range bin long and one azimuth beamwidth wide, and is commensurate with minimum discernable targets. All of this is known in the art. A track-while-scan radar of this type is disclosed, inter alia, in Frank Pat. No. 3,182,320, assigned to the U. S. Air Force, which is an analog system. A more sophisticated, digital track-while-scan radar is known as the AN/APQ-148. An illustration of the tracking function detail is shown in my commonly-owned copending application Ser. No. 248,240, filed on Apr. 27, 1972, entitled RADAR VIDEO CLIPPING LEVEL DERIVED FROM TARGET SIGNAL.

The track-while-scan radar will track a target as best it can once the target is identified by the operator, which is done by positioning cursors over the target. One cursor is advanced in range while the other is advanced in azimuth until both cursors over lay either the center or an edge of the target. Thereafter, the electronics takes over, and by supplying gates which are initially centered about the positions of the cursors, monitor the energy in early and late gates in both range and azimuth and automatically slew the cursors thereafter to maintain maximum energy. In early systems, the cursors may have been displayed mechanically as an overlay on top of the radar display screen; in more modern systems, the cursors are electronically generated and mixed with the radar video so as to form a portion of the electronic radar display. However, the accuracy of the tracking system is dependent in large measure upon the initial accuracy of the operator in placing the cursors correctly with respect to the target. Frequently, the operator will place the cursor with respect to edges of the target since the cursors themselves tend to mask out the target when centered thereover. In addition, human judgement is required in picking the particular spot over the target where the cursors are laid prior to activating the automatic tracking feature of the system.

SUMMARY OF INVENTION

The primary object of the present invention is to provide an improved cursor apparatus for a tracking radar.

According to the present invention, the energy content of the tracking gates is utilized to blank out the cursor in the area of the display which is included within the tracking gates, and to intensity modulate the video within the tracking gate region, whereby the placement of the cursor is achieved in response to maximum intensity of the video in the area of the tracking gates.

The present invention is readily implemented at low cost utilizing standard components which are readily available in the market-place. The present invention avoids obliteration of targets by cross hairs, avoids human error in the placing of cursors, and enhances the accuracy of tracking radars by permitting a more accurate initialization of the automatic tracking process.

Other objects, features and advantages of the present invention will become more apparent in the light of the following detailed description of a preferred embodiment thereof, as illustrated in the accompanying drawing.

BRIEF DESCRIPTION OF THE DRAWING

FIG. 3 is a simplified schematic block diagram of an improved cursor apparatus according to the present invention.

DESCRIPTION OF THE PREFERRED EMBODIMENT

Figure 1:
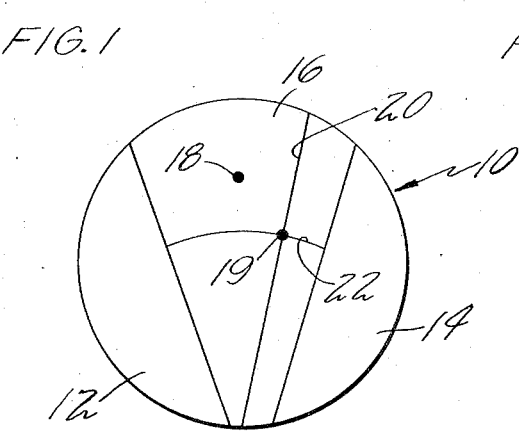
FIG. 1 is a simplified illustration of a cursor in a PPI display of the type known to the prior art.

Referring now to FIG. 1, a PPI display 10 includes blanked out portions 12, 14 and a portion 16 wherein targets 18, 19, representing return signals from a radar, are presented for display. Superposed on the radar video are video signals representing an azimuth cursor 20 and a range cursor 22, which cursors are placed by manually adjusted means manipulated by an operator in order to designate a particular target which is to be tracked. By manipulating range and azimuth potentiometers (or the like), display generating apparatus alter the position of the generated cursor displays so as to move them in range or in azimuth, as the case may be, so that the operator can make continued adjustments until both cursors appear to bisect the target. Alternatively, the cursors may be laid on edges of the target if desired. As is well known, and as is exemplified in the aforementioned Frank patent and in the AN/APQ-148 radar, once the cursors are laid, the automatic track mode can be initiated by the operator, and tracking gates associated with the radar apparatus will continuously cause slewing of the range and azimuth cursors based upon maximizing the energy content within the tracking gates.

Figure 2:
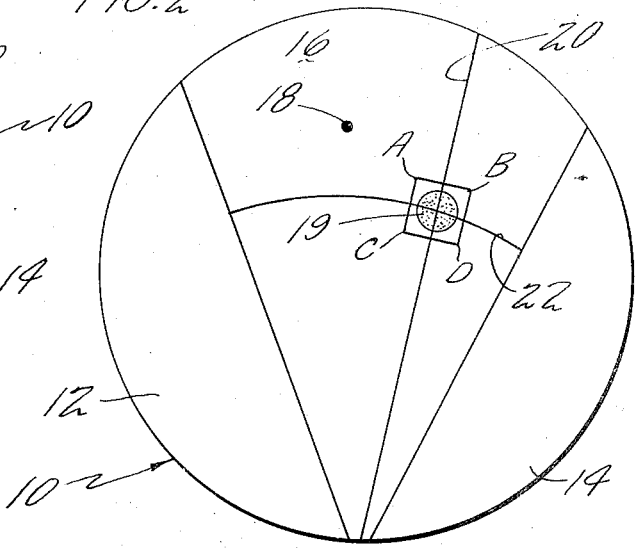
FIG. 2 is a simplified illustration of a PPI display having cursors and indicating, to an exaggerated scale, tracking gates thereon.

As is illustrated in FIG. 2, the tracking gates result in four areas A, B, C, D which are defined by mixing of early range (areas C and D), late range (areas A and B), early azimuth (areas A and C, assuming that the sweep is from left to right as shown in the figures) and late azimuth (areas B and D). These are alternatively referred to as early and late Rho and Theta gates, as in the Frank patent, or as early and late and left and right gates, as in the AN/APQ-148 radar. In any event, the energy content of each quarter (A-D) of the tracking gate is caused to remain equal to that in each other quarter, by slewing the cursors 20, 22 and the associated electronic equipment which defines the timing of the gates, thereby to track the target.

However, positioning of the cursors in the first instance so as to select the correct target (particularly with small, weak targets, or in a clutter of several targets) is difficult to achieve by operator means since human judgment is involved, and since many times the cursor tends to obliterate the target itself, thereby making the centering thereof over the target extremely difficult.

The general precept of the present invention is first, to blank out the electronic cursors 20, 22 within the area (A-D) of the tracking gate, and second to intensity modulate the video signal within the tracking gate so that it is brighter when the target is more nearly centered on the cursors, and not as bright when it is less well centered on the cursors. This reduces the task of centering the cursors to one of monitoring intensity of the target level within the area where the cursors are blanked out.

Referring now to FIG. 3, radar video is provided on a line 30 by the radar apparatus in a manner which is well known in tracking radars. The radar video is applied to a video mixer 32 wherein there is mixed therewith the electronic cursor signals applied by the tracking apparatus on a line 34. In the present apparatus, and in accordance with the present invention, the mixed cursor signals on the line 34 are applied to the video mixer 32 through a video gate 36 which is connected thereto by a line 38. Thus the mixed cursor signals can be blanked, from being mixed with the video in the video mixer 32 for application over an output line 40 to the display apparatus, simply by blocking the video gate 36. In addition, the video mixer 32 has an additional input 42 thereto which is provided by a video gate 44 that selectively applies a DC bias level on a line 46 to the video mixer 32 so as to intensity modulate the video in an amount dependent upon the magnitude of the signal on the line 46 whenever the video gate 44 is actuated. The video gates 36, 44 are both actuated under the control of an AND circuit 48 in such a fashion that the video gate 44 is open whenever the AND circuit 48 operates, and, by means of an inverter 50, the video gate 36 is closed whenever the AND circuit 48 operates. In other words, there is complete coincidence with the blanking of the mixed cursor signals from the display and the intensification of video within the gate region. The AND circuit 48 is operative only in response to a signal on a line 52 from an OR circuit 54 which in turn responds to early, late, left and right gate signals on corresponding lines 56-59, which signals correspond with the related gates utilized for energy comparison in the automatic tracking mode. The signal on the line 52 could alternatively comprise the Rho, Theta gate signal which is applied by the Rho, Theta gate 32 to the video gate 34 in the aforementioned Frank patent, or a mix of Early and Late and Left and Right, as in the AN/APQ-148. The AND circuit 48 also requires a signal on a line 62 from a compare circuit 64 which provides such signal only in the case where an input on a line 66 is greater in magnitude than an input on a line 68. The input on the line 66 is derived from a scaling circuit, which may be an amplifier 70 provided with a suitable scaling factor, which is in turn responsive to video on a line 72 that is presented only when a video gate 74 is operated by the signal on the line 52. In other words, the amplifier 70 provides an output on the line 66 only during the presence of the entire tracking gate. If found desirable, the video gate 74 may simply comprise the video gate 34 of the aforementioned Frank patent. Also, the amplifier 70 may be provided with a small filter to smooth the video for comparison, if desired. The video gate circuit 74 receives radar video at its input on the line 30. The signal on the line 68 is similarly provided by a scale factor circuit such as an amplifier 76 which is driven by an integrator 78 that provides an indication of the general video level of the radar video. Thus, the compare circuit 64 compares the video level within the tracking gate to the general video level of the entire field of search by the radar, and when the level within the gate is higher by some factor (as is determined by the relative scale factors $a$, $b$ of the amplifiers 70, 76) only then will the compare circuit 64 provide an output to operate the AND circuit 48. In other words, the AND circuit 48 will come into play so as to cause thd double operation of the present invention (blanking out of the cursors and brightening of the display) only when there is a definite target within the gates. Thus, careful manipulation of the cursors so as to be close enough to a target to present that target within the tracking gate will cause the circuit to commence operation and thereby blank the cursors and intensify the video within the region of the display which falls within the tracking gate.

Figure 4:
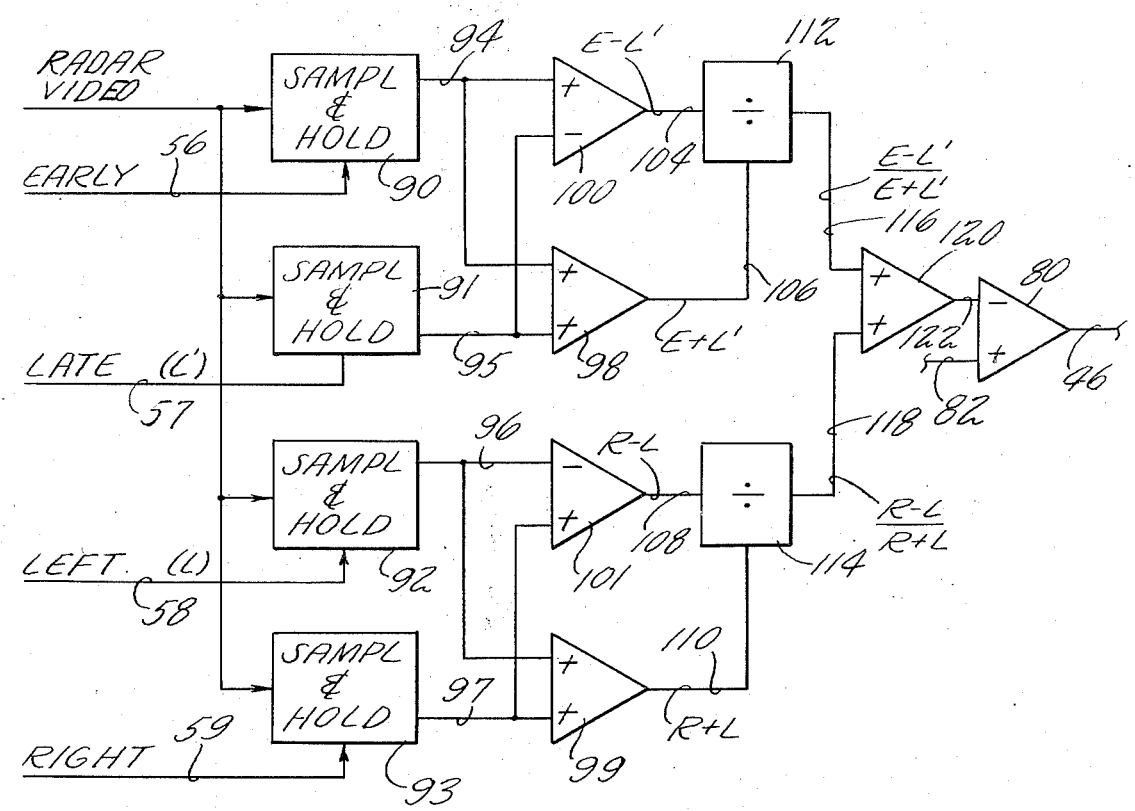
FIG. 4 is a simplified schematic block diagram of an alternative to a portion of the embodiment of FIG. 3.

The level of intensity is controlled, as aforementioned, by the magnitude of the signal on the line 46, which in turn is derived by a difference circuit 80 (which may comprise a differential amplifier) that compares the level of video within the tracking gate, on line 72, with a voltage representing maximum desired intensity which is applied on a line 82. This voltage may be derived by a potentiometer 84 connected to a suitable voltage source 86. If the voltage source 86 is of an opposite polarity to the video on the line 72, then the circuit 80 may comprise a summing circuit, if desired. In any event, the signal on the line 46 represents the difference in intensity which the present video level will generate from a desired maximum intensity, so as to limit the maximum intensity which will be presented on the display, as the cursors are adjusted and the amount of energy within the tracking gate is increased. By keeping the voltage on line 46 small with respect to maximum video, it simply intensifies the video. An alternative method of obtaining the intensity modulation signal on the line 46 is illustrated in FIG. 4. Therein, there is provided a plurality of sample and hold circuits 90–93 each of which respectively samples the video at times related to the early, late, left and right gate signals on the lines 56–59 so as to provide voltages at respective outputs 94–97 indicative of the proportion of target video within respective gates. The sums are taken in respective amplifiers 98, 99 and the differences are taken in respective amplifiers 100, 101. This provides an early minus late signal on a line 104, an early plus late signal on a line 106, a right minus left signal on a line 108, and a right plus left signal on a line 110. These signals are passed through related analog divider circuits 112, 114 (which are readily available in integrated circuit form) so as to provide normalized difference video signals on related lines 116, 118. These normalized video difference signals are signals typically used in more modern and sophisticated track-while-scan radars to balance the energy content in the tracking gates thereby to cause automatic tracking. The normalized video difference signals are summed in a summing amplifier 120 to provide a signal on a line 122 which is a measure of the intensity of video within the tracking gates, and therefore a measure of the accuracy of the placement of the cursors. Thus, when the cursors are properly placed, both the normalized video difference signals on the lines 116, 118 will be a minimum so that their summation on the line 122 will also be a minimum and the signal on the line 46 will be the maximum established by the signal on the line 82. On the other hand, when the cursors are not properly set on the target, the signal on the line 122 will be larger, and being subtracted from this signal on the line 82, will provide a lesser signal on the line 46, which will enhance the intensity of the video within the target gate by a lesser amount. The modification of FIG. 4 has been shown separately for clarity, but represents the preferred form of obtaining the intensity signal on the line 46.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. An electronic radar display cursor apparatus comprising:

a video mixer;

a source of radar video signals applied to said video mixer;

a source of display cursor signals;

a first gate responsive to said source of display cursor signals for selectively applying said signals to said video mixer;

first means presenting signals identifying an automatic tracking gate related to the intersection of the pair of cursors represented by said cursor signals;

a second video gate responsive to said source of radar video signals and to said automatic tracking gate signals and selectively operable by said tracking gate signals to pass said radar video signals;

control means connected for response to said source of radar video signals and to said second video gate for comparing the magnitude of signals within the region of said tracking gate with the average magnitude of signals representing said radar video, and responsive to said gated video being in excess of said average radar video by a given amount and to the presence of said tracking gate signals to selectively block said first video gate, thereby blanking out said display cursor signals in the region of said tracking gate.

2. An electronic radar display cursor apparatus according to claim 1 further comprising:

a third video gate connected to said video mixer;

a source of a preselected voltage representing a desired maximum display intensity;

difference means responsive to said source and to said second video gate for providing a level signal, representing the difference between said gated video and said preselected voltage, to said third video gate;

said third video gate selectively operable in response to said control means to provide said level signal to said video mixer, thereby to intensify the brightness of radar video within said gate concurrently with the blanking of said cursor signals.

3. An electronic radar display cursor according to claim 1, further comprising:

a third video gate;

means responsive to said source of radar video signals and to said source of tracking gate signals to provide signals representative of normalized video intensity within the region of said video gates;

summation means providing the sum of said normalized video intensity signals;

a source of a preselected voltage representing a desired maximum display intensity;

difference means responsive to said preselected voltage source and to said summation means for providing to said third video gate a level signal representing the difference between said sum signal and said preselected voltage, said third video gate selectively operable in response to said control means to provide said level signal to said video mixer, thereby to intensify the brightness of radar video within said gate as a function of the accuracy of adjusting the cursors over a target within said gate, concurrently with the blanking of said cursor signals.

4. An electronic radar display cursor apparatus according to claim 1 wherein said control means comprises:
an integrator responsive to said radar video signals;
a first amplifier, having a first scale factor adjustment, responsive to said integrator;
a second amplifier responsive to said second video gate and having a second scale factor;
a comparator responsive to the output of said first and second amplifiers;
an AND circuit responsive to said comparator and to said video gate signals for generating a signal; and
means responsive to said signal for blocking said first video gate.

* * * * *

PO-1050
(5/69)

UNITED STATES PATENT OFFICE
CERTIFICATE OF CORRECTION

Patent No. 3,787,847      Dated January 22, 1974

Inventor(s) Paul M. Danzer

It is certified that error appears in the above-identified patent and that said Letters Patent are hereby corrected as shown below:

After "Inventor:" and before "Filed:" insert

-- Assignee: United Aircraft Corporation, East Hartford, Connecticut --

Signed and sealed this 24th day of September 1974.

(SEAL)
Attest:

McCOY M. GIBSON JR.
Attesting Officer

C. MARSHALL DANN
Commissioner of Patents